Figures 1, 2:
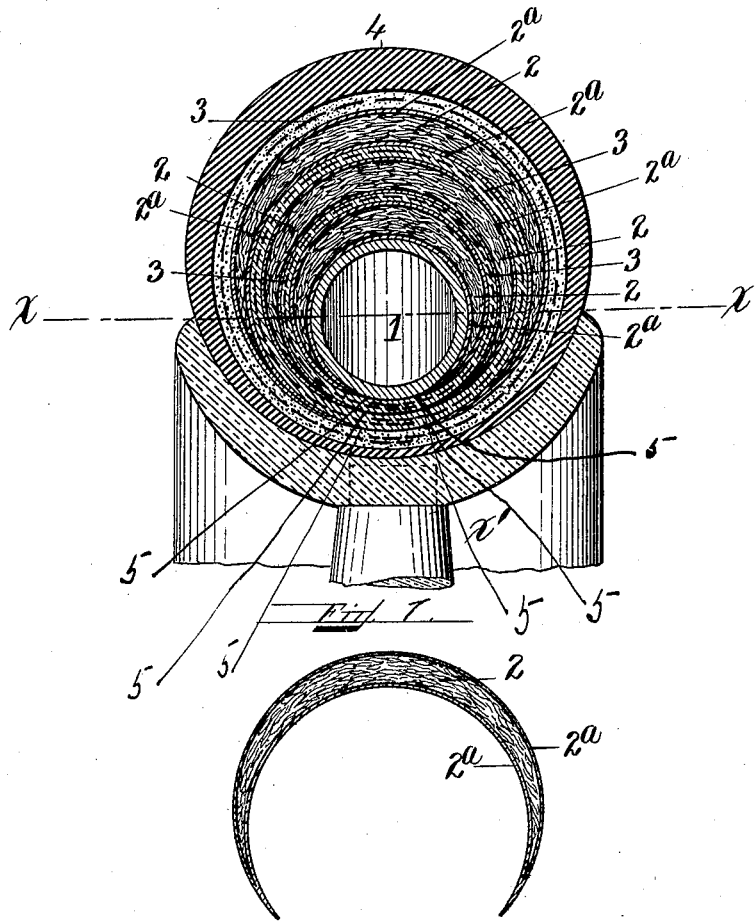

No. 794,197. PATENTED JULY 11, 1905.
W. F. STEARNS.
PNEUMATIC TIRE.
APPLICATION FILED AUG. 8, 1904.

Witnesses:
E. A. Allen.
W. E. Coveney.

Inventor:
William F. Stearns
by his attorney
Edward S. Beach

No. 794,197. Patented July 11, 1905.

UNITED STATES PATENT OFFICE.

WILLIAM FRANCIS STEARNS, OF BATAVIA, NEW YORK.

PNEUMATIC TIRE.

SPECIFICATION forming part of Letters Patent No. 794,197, dated July 11, 1905.

Application filed August 8, 1904. Serial No. 219,807.

*To all whom it may concern:*

Be it known that I, WILLIAM FRANCIS STEARNS, a citizen of the United States, residing at Batavia, in the county of Genesee and State of New York, have invented certain new and useful Improvements in Pneumatic Tires, of which the following is a specification, reference being had therein to the accompanying drawings.

The object of my invention is to produce a strong and durable pneumatic tire for wheels of vehicles of various sorts, and especially for the wheels of heavy and high-speed vehicles in which the wear and tear of the tires are very great.

Figure 1 is a cross-section of a tire embodying my invention. Fig. 2 is a cross-section of the preferred form of puncture-resisting pad detached.

In the drawings illustrating the principle of my invention and the best mode now known to me of applying that principle, 1 is the inflatable air-tube and it is incased in a plurality of alternating puncture-resisting pads 2 and binders 3, all of which, together with the air-tube, are contained in an outer sheath or casing 4 of any desired construction. Puncture-resisting pads 2 are each approximately crescent-shaped and are preferably made up of a thin casing $2^a$, of rubber or the like, filled with any suitable material, preferably smoked cotton fibers packed closely together—that is, practically felted—so that the fibers interlock and are well compacted and possess the increased strength given them by smoking or partial carbonization. Each pad 2 extends wholly around the tire in the direction of its annular circumference and only partially around the tire cross-sectionally considered. Thus the side margins of the innermost pad extend past the felly-line $x$ $x$ of the tire well toward the inner periphery of the air-tube, but not all the way around, leaving on the inner peripheral portion of the air-tube a space 5 5, which is not covered by the pad, but which is covered by the innermost binder 3, made of fabric and rubber and wrapped around and binding together the air-tube and innermost pad. The next outermost pad is similarly mounted on the innermost pad. Then another binder is applied as before, and so on until a tire is built up of alternating pads and binders to the desired cross-sectional diameter, when the cover or sheath 4 is applied. The pads each have the rubber casing $2^a$ by preference to facilitate the handling of the fibrous filling and for vulcanizing, cementing, or the like to the contacting walls of the binders if it is desired to secure all the parts together. The binders are preferably made of duck and rubber, as will be readily understood by all skilled in the art without further description.

The margins of the pads all extend inwardly beyond the felly-line $x$ $x$ of felly $x'$, so that the tire may have maximum multiple reinforcement at and near the felly-line where pneumatic tires are apt to break out in consequence of the churning to which they are subjected by the jolting of vehicles to the wheels of which they are applied.

It will be observed that inflation of the air-tube will greatly compact the fibers in the pad on the air-tube and that the tendency to distention will be checked by the innermost binder, which is relatively inelastic in consequence of the duck or other fabric which forms part of it. The other binders hold the other pads in place, and the inner peripheral wall portions of the binders all contact one with another between the inner edges of the pads—that is, opposite the space 5 5, where the air-tube and innermost binder contact. This arrangement of the various parts produces a thick rubber and duck inner peripheral wall of the tire at the spaces 5 5, which is stiff enough to make strong contact with the tire-seat of the felly. The rest of the tire, cross-sectionally considered, is highly flexible and has its air-tube protected by a multiplicity of alternating pads and binders, the outward walls of the air-tube being removed as far as possible from the exposed side and tread surfaces of the tire, so that danger of penetration of the air-tube is decreased. It is obvious that if a sharp object—a nail, for example—pierces the sheath 4 it may be deflected by the outermost binder; but if it passes through that binder it will have to pass through several alternating pads and binders before reaching the air-tube. Such passage is well nigh impossible, because each binder tends to deflect the penetrating object, and each pad is very highly puncture-resisting in consequence of the smoked or partially carbonized cotton fibers which preferably, but not necessarily, are used as puncture-resisting material. It is a fact that smoked or partially-carbonized cotton fibers possess from three to four times the strength of raw cotton fibers of the same grade, and the intermeshing of the cotton fibers and their increased tensile strength, due to smoking or partial carbonization, gives the pads very great puncture-resisting quality. It will be observed that the edges of the crescent-shaped pads all point toward the middle circumferential line of the tire-seat and that the pads decrease in thickness from their middle to their edges. Consequently as the thinned edges of the pads are very flexible a considerable amount of resiliency is given to the tire along transverse lines parallel with the felly-line $x\ x$, this resiliency being available when the vehicle is jolted. My desire is to combine marked resiliency with marked strength, and by having the thinned edges and marginal portions of the multiplicity of pads all extend inwardly toward the tire-seat I secure the desired result. I prefer that the thinned edges of the pads shall not meet; but they may be brought together or even lapped, if desired, without departing from my invention.

The opposed surfaces of the casing, binders, pad-cases, and air-tube may be vulcanized or cemented together, if preferred, or left loose, or some of said parts may be secured together and others left loose, if preferred.

What I claim is—

In a pneumatic tire, the combination of an air-tube; a plurality of alternating puncture-resisting pads and binders, and an outer sheath; the pads being approximately crescent-shaped and having thinned side marginal portions which extend inwardly past the felly-line of the tire, the pads consisting of thin casings of vulcanizable material filled with puncture-resisting fibrous material; the binders being of vulcanizable material; and the casings, binders and outer sheath being vulcanized together.

In testimony whereof I affix my signature in presence of two witnesses.

WILLIAM FRANCIS STEARNS.

Witnesses:
EDWARD S. BEACH,
E. A. ALLEN.